(12) United States Patent
Kawai et al.

(10) Patent No.: US 7,573,418 B2
(45) Date of Patent: Aug. 11, 2009

(54) TAG COMMUNICATION APPARATUS, CONTROL METHOD FOR TAG COMMUNICATION APPARATUS, COMPUTER READABLE MEDIUM FOR TAG COMMUNICATION CONTROL AND TAG COMMUNICATION CONTROL SYSTEM

(75) Inventors: Takehiro Kawai, Kyoto (JP); Keisuke Saito, Kyoto (JP); Shinichiro Okamura, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 30 days.

(21) Appl. No.: 11/155,776

(22) Filed: Jun. 20, 2005

(65) Prior Publication Data

US 2005/0280538 A1 Dec. 22, 2005

(30) Foreign Application Priority Data

Jun. 22, 2004 (JP) ............................. 2004-184094

(51) Int. Cl.
*G01S 13/74* (2006.01)
*G01S 13/08* (2006.01)
*G08B 13/14* (2006.01)
*H04M 1/00* (2006.01)

(52) U.S. Cl. .................. 342/42; 342/126; 340/572.1; 455/562.1

(58) Field of Classification Search ................ 342/126; 340/572; 455/562
See application file for complete search history.

(56) References Cited

U.S. PATENT DOCUMENTS

| 5,835,060 | A | 11/1998 | Czarnecki et al. |
| 6,046,683 | A | 4/2000 | Pidwerbetsky et al. |
| 6,175,332 | B1* | 1/2001 | Fedors ................ 343/700 MS |
| 6,380,894 | B1 | 4/2002 | Boyd et al. |
| 6,714,121 | B1* | 3/2004 | Moore ........................ 340/10.3 |
| 2002/0082016 | A1* | 6/2002 | Obayashi .................... 455/436 |
| 2003/0058155 | A1 | 3/2003 | Landt et al. |
| 2004/0027243 | A1 | 2/2004 | Carrender |
| 2004/0035927 | A1 | 2/2004 | Neumark |
| 2004/0174434 | A1* | 9/2004 | Walker et al. ............. 348/211.3 |
| 2005/0113138 | A1* | 5/2005 | Mendolia et al. ............. 455/558 |
| 2005/0148346 | A1* | 7/2005 | Maloney et al. ........... 455/456.6 |
| 2005/0159187 | A1* | 7/2005 | Mendolia et al. ......... 455/562.1 |
| 2005/0280538 | A1* | 12/2005 | Kawai et al. ............. 340/572.1 |

(Continued)

FOREIGN PATENT DOCUMENTS

EP 0580139 A2 1/1994

(Continued)

OTHER PUBLICATIONS

Kikuma, N., "High Resolution estimation of incoming direction by array antenna", Science Press, Inc., Chptr. 9, pp. 172-189 (1998).

(Continued)

*Primary Examiner*—Thomas H Tarcza
*Assistant Examiner*—Harry Liu
(74) *Attorney, Agent, or Firm*—Foley & Lardner LLP

(57) ABSTRACT

A direction estimating section estimates the incoming direction of a radio wave from an RFID tag in each of antennas. A position calculating section calculates the position of the RFID tag on the basis of the incoming direction of the radio wave estimated in the direction estimating section.

9 Claims, 13 Drawing Sheets

U.S. PATENT DOCUMENTS

| | | | |
|---|---|---|---|
| 2005/0280574 A1* | 12/2005 | Tafas et al. | 342/126 |
| 2006/0010027 A1* | 1/2006 | Redman | 705/10 |
| 2006/0077039 A1* | 4/2006 | Ibi et al. | 340/10.1 |
| 2006/0258442 A1* | 11/2006 | Ryan | 463/29 |
| 2006/0281415 A1* | 12/2006 | Koyanagi | 455/67.11 |

FOREIGN PATENT DOCUMENTS

| | | |
|---|---|---|
| EP | 0583522 A2 | 2/1994 |
| GB | 2383708 A | 7/2003 |
| JP | 6-258425 | 9/1994 |
| JP | 8-248127 | 9/1996 |
| JP | 9-5431 A | 1/1997 |
| JP | 10-206538 | 8/1998 |
| JP | 2002-198722 A | 7/2002 |
| JP | 2002-262328 | 9/2002 |

OTHER PUBLICATIONS

Yasuda, A., "The Aspect of GPS Technology", J. Inst. Of Electronics, Information and Communication Engineers, B. vol. J84-B, No. 12, pp. 2082-2091 (2001).

"Highly accurate position measuring technique using portable telephone that can use positional information service even indoors", http://www.hitachi.co.jp/Sp/TJ/2001/hmjan01/hm0111j.htm (Jun. 7, 2005).

* cited by examiner

BEAM SCANNING METHOD

NULL SCANNING METHOD

TAG COMMUNICATION APPARATUS, CONTROL METHOD FOR TAG COMMUNICATION APPARATUS, COMPUTER READABLE MEDIUM FOR TAG COMMUNICATION CONTROL AND TAG COMMUNICATION CONTROL SYSTEM

This application claims foreign priority based on Japanese Patent application No. 2004-184094, filed Jun. 22, 2004, the contents of which is incorporated herein by reference in its entirety.

BACKGROUND OF THE INVENTION

1. Field of the Invention

The present invention relates to an apparatus for communicating with an RFID (Radio Frequency Identification) tag through a radio wave (hereinafter, referred to as tag communication apparatus), a control method for a tag communication apparatus, a computer readable medium for tag communication control and a tag communication control system.

2. Description of the Related Art

In recent years, the use of an RFID (Radio Frequency Identification) tag (radio rag) has been progressively spread. The radio tag is anticipated especially in a field of physical distribution as an alternative of a bar code. Thus, the radio tag is expected to be widely used in near future.

Currently, a frequency band directed to the radio tag includes a 13.56 MHz band, what is called an UHF band of approximately from 800 MHz to 960 MHz, a 2.45 GHz band or the like. The radio wave of the UHF band or the 2.45 GHz band of these bands has an advantage that a communication distance can be easily extended longer compared to that of the radio wave of the 13.56 MHz band. Further, the radio wave of the UHF band advantageously goes round to shadows more easily compared to the radio wave of the 2.4 GHz. Accordingly, the radio tag and a reader/writer using the radio wave of the UHF band have been progressively developed.

When the radio wave of the UHF band is employed, a distance in which the reader/writer can communicate with the radio tag can be extended from several ten centimeters to about several meters, as compared with a case in which the radio wave of the 13.56 MHz band which is used mainly currently is employed. Therefore, when the radio wave of the UHF band is employed, a communication area as a space region in which the reader/writer can communicate with the radio tag can be extended to a relatively wide range. (Refer to JP-A-2002-198722, JP-A-9-5431, "View of GPS technology", Journal of Institute of Electronics, Information, and Communication Engineers, B, Vol. J84-B, No. 12, pp. 2082-2091, December 2001, "Highly accurate position measuring technique using portable telephone that can use positional information service even indoors" http://www.hitachi.co.jp/Sp/TJ/2001/hrnjan01/hrn0111j.htm, "Adaptive signal processing by array antenna", Chapter 9, High resolution estimation of incoming direction by array antenna, Nobuyoshi Kikuma, Science Press, Inc., issued on Nov. 25, 1998.)

As described above, when the distance in which the reader/writer can communicate with the radio tag is set to about several meters, the communication area is widened. Thus, the number of the radio tags present in the communication area is undesirably increased more than the required number. Accordingly, various methods may be considered for limiting the communication area to a specific space region.

FIG. 15A shows an example in which beam forming areas are overlapped to control a communication area. In this example, a plurality of antennas 51 whose directivity is narrowed by a beam forming operation is arranged. Thus, a space region obtained by overlapping communication areas 52 respectively formed by each of the antennas 51 provided in the reader/writer is set as the communication area by the reader/writer.

FIG. 15B shows an example in which a communication area is controlled by a beam scanning operation. In this example, an antenna 51 whose directivity is narrowed is used. A predetermined space region is scanned by sequentially changing a directive direction of the antenna 51 within a predetermined range. Further, in this example, two antennas 51 that scan different space regions respectively are provided. A space region obtained by overlapping each of the scanned areas is set as a communication area by the reader/writer.

In the above-described two examples, since the antennas 51 having a high directivity are employed, following merits are obtained as compared with a case in which the antennas 51 having a low directivity are used. Firstly, since the communication area 52 covered by the single antenna 51 is narrow, the generation of the collision of the communication can be suppressed and the reliability of the communication can be improved. The collision of the communication means that the collision of the communication arises between the antenna 51 and the number of radio tags, since a number of radio tags are present in the communication area 52 corresponding to the certain antenna 51 at the same time. When the collision of the communication arises, the reliability of the communication is lowered.

Further, when the antenna having the low directivity is used, an incommunicable region where the reader/writer cannot communicate with the radio tag is generated within the communication area, which is due to an interference between a direct wave from the reader/writer and a reflected wave which is reflected by a floor surface or a wall surface. However, when the antenna 51 having the high directivity is used, such an inconvenience can be eliminated.

However, the above-described examples have the following problems. A first problem is that an influence (incommunicable region) due to a multipath arises. FIG. 16A shows a state that the multipath is generated. When a reflector 54 exists in the direction of the directivity of the antenna 51, a beam outputted from the antenna 51 is reflected by the reflector 54. Thus, the beam is also irradiated to a space region located outside the direction of the directivity of the antenna 51. Accordingly, communication with a radio tag located in a space region other than an estimated communication area is undesirably carried out.

In order to prevent this area distortion, for every place in which the reader/writer is installed, an environment where the reader/writer is installed needs to be tuned, or a radio wave cut-off configuration needs to be provided so as not to be influenced by the multipath. For instance, as shown in FIG. 16B, a radio wave absorber is provided on a surface opposed to the antenna 51 in the communication area in order to prevent the multipath.

Further, a second problem is the structural size of the antenna 51 is enlarged. When the communication area is controlled by overlapping the beam forming areas or performing the beam scanning operation as in the above-described examples, the directivity of the antenna 51 needs to be relatively enhanced. The antenna 51 is configured with, for instance, a patch antenna or an array antenna. In order to strengthen the directivity, the number of antenna elements 51a provided in the antenna 51 needs to be increased. FIG. 17A shows a state of the antenna elements 51a provided in the antenna 51 when the directivity is relatively low, and FIG.

17B shows a state of the antenna elements 51a provided in the antenna 51 when the directivity is relatively high, respectively.

Further, a third problem is that when a beam scanning operation is carried out, in order to enhance the resolution in a scanning direction, a control of a voltage applied to the antenna elements 51a and the phase thereof becomes complicated. FIG. 18 shows a state when the scanning direction of the antenna 51 is changed. As shown in FIG. 18, the antenna elements 51a are respectively provided with voltage controlling phase shifters 51b. In order to change the scanning direction, the voltage applied to the antenna elements 51a respectively corresponding to the voltage controlling phase shifters 51b and the phase of the voltage need to be controlled. Here, in order to enhance the resolution in changing the scanning direction, the voltage controlling phase shifters 51b respectively need to be controlled more finely. Thus, calculation for the control becomes more complicated, and each of the voltage controlling phase shifters 51b needs to be highly accurate.

On the other hand, a method may be considered for limiting the communication area by specifying the position of a radio tag performing a communication, and determining whether or not the position of the radio tag is located in a predetermined space region. Here, in "View of GPS technology", Journal of Institute of Electronics, Information, and Communication Engineers, B, Vol. J84-B, No. 12, pp. 2082-2091, December 2001, a technique that specifies the position of a GPS receiver by using a GPS is disclosed. In this technique, the GPS receiver measures the incoming time of radio wave from a plurality of GPS satellites to calculate distances between each of the GPS satellites and the GPS receiver. Then, the position is specified based on the calculated distances.

Further, in "Highly accurate position measuring technique using portable telephone that can use positional information service even indoors" http://www.hitachi.co.jp/Sp/TJ/2001/hrnjan01/hrn0111 j.htm, a technique is disclosed that the same system as that of the position detection by the GPS is applied to a portable telephone to specify the position of the portable telephone. In this technique, a base station in a portable telephone network plays the role of the GPS satellite in GPS to measure the position.

The above-described techniques may be applied to a specifying operation of the position of the radio tag so as to limit the communication area. However, in this case, following problems arise. Initially, in the radio tag side, for instance, a complicated circuit for measuring distances to the plurality of the antennas is required. For instance, to measure the distance between the antenna and the radio tag, timekeeping section for measuring the transmission time of the radio wave is required. To measure the transmission time of the radio wave located within a distance of about several meters or smaller, extremely highly accurate timekeeping operation needs to be carried out. Further, a synchronization of time with each of the antennas needs to be extremely highly accurately carried out. Since the radio tag basically and preferably has features such as low cost, compact form and low power consumption, it is not preferable to mount such a circuit having high functions on the radio tag.

SUMMARY OF THE INVENTION

Considering the above-described problems, it is an object of the present invention, in a tag communication apparatus that performs a radio communication with the RFID tag through a radio wave, to provide a tag communication apparatus capable of specifying the position of each RFID tag with a simple configuration, a control method of a tag communication apparatus, a computer readable medium for tag communication control and a tag communication control system.

In order to solve the above-described problems, according to an embodiment of the invention, an apparatus for communicating with an RFID (Radio Frequency Identification) tag through a radio wave, said apparatus comprises at least one antenna which receives the radio wave from the RFID tag, a direction estimating section which estimates an incoming direction of the radio wave from the RFID tag in said at least one antenna when the radio wave from the RFID tag is received in said at least one antenna, and a position calculating section which calculates a position of the RFID tag based on the estimated direction.

Further, in order to solve the above-described problems, according to an embodiment of the invention, a method for controlling an apparatus having at least one antenna which receives a radio wave from an RFID (Radio Frequency Identification) tag to communicate with the RFID tag, said method comprises estimating an incoming direction of the radio wave from the RFID tag in said at least one antenna when the radio wave from the RFID tag is received in said at least one antenna, and calculating a position of the RFID tag based on the estimated direction.

In the above-described configuration and the method, firstly, the tag communication apparatus is provided with at least one antenna. Then, the incoming direction of the radio wave from the RFID tag in each antenna is estimated. In such a way, when the incoming direction of the radio wave is respectively estimated in the at least one antenna, it can be estimated that the RFID tag is located in the vicinity of a point on which the incoming directions of the radio wave converge. Therefore, according to the above-described configuration and the method, on the tag communication apparatus side, the signal received at each antenna is simply processed without adding a special configuration on the RFID tag side. Accordingly, the tag communication apparatus can be provided that can specify the position of the RFID tag capable of performing a communication.

According to a direction estimating method referred to as an ESPRIT, two positions of an array antenna forming one antenna are used so that the incoming directions of the radio-wave in the respective positions can be estimated. That is, when the direction estimating method is employed, the above-described configuration and the method according to an embodiment of the present invention can be seemingly realized with a single antenna.

Further, the tag communication apparatus according to an embodiment of the present invention may further comprises an area determining section which determines whether the calculated position of the RFID tag is within a space region.

Usually, in order to communicate with only the RFID tag located within the space region, for instance, a configuration needs to be taken such as a radio wave absorber is installed in the periphery of the space region. As compared therewith, according to the above-described configuration, whether or not the RFID tag is located within the space region is determined on the basis of the position calculated in the position calculating section. Accordingly, an area limitation can be performed without providing the special configuration in an area where the RFID tag may possibly exists and without being influenced by a surrounding environment.

Further, also in the tag communication apparatus side, since the area limitation is performed by signal processing, change of the area limitation can be easily performed. Accordingly, the tag communication apparatus having a higher flexibility can be provided.

Further, the tag communication apparatus according to an embodiment of the present invention further comprises a radio wave measuring section which measures an intensity of the radio wave from the RFID tag received in said at least one antenna, and an intensity ratio estimating section which estimates a ratio of the intensity of the radio wave received in said at least one antenna based on a distance between the calculated position of the RFID tag and said at least one antenna, wherein the position calculating section validates the calculated position of the RFID tag based on a ratio of the measured intensity of the radio wave in said at least one antenna and the estimated ratio of the intensity of the radio wave in said at least one antenna.

The radio wave received from the RFID tag in the antennas respectively may be influenced by the above-described multipath in some cases. When the radio wave is affected by the multipath, the position of the RFID tag calculated in the position calculating section may possibly be different from an actual position. As compared therewith, in the above-described configuration, the multipath is detected by utilizing a fact that the distance between the position of the RFID tag detected on the basis of the estimation of the direction including the multipath and each of antennas is different from the distance between the actual position of the RFID tag and each of antennas. That is, when the estimation of the direction including the multipath is performed, the ratio of the intensity of the actually received radio wave is different from the ratio of the intensity of the received radio wave based on the calculated position. Thus, the position calculating section detects the difference so that the position calculating section can detect an error of the detection of the position based on the multipath. Accordingly, the position can be more accurately detected.

In the tag communication apparatus according to an embodiment of the present invention, said at least one antenna includes a plurality of antenna elements, and the direction estimating section performs signal processing of an output from said at least one antenna so as to execute a scanning operation.

According to the above-described configuration, the signal processing of the output from each of said at least one antenna having the plurality of the antenna elements is performed so as to execute a scanning operation, and the incoming direction of the radio wave is estimated. Accordingly, as compared with, for instance, a configuration in which the scanning operation is performed by physically changing the direction of the antenna, a scanning antenna can be realized with a more simple structure in view of configuration. Thus, a more inexpensive tag communication apparatus can be provided.

In the tag communication apparatus according an embodiment of the present invention, the direction estimating section estimates the incoming direction of the radio wave by null scanning.

When the incoming direction of the radio wave is estimated by the null scanning method, the incoming direction of the radio wave can be detected with a higher resolution than that of a beam scanning method under the same configuration of the antenna and the same conditions. Conversely, when the null scanning method is used under the same resolution as that of the beam scanning method, the number of the antenna elements in the antenna can be decreased and the size of the antenna can be decreased.

In an embodiment of the present invention, a computer readable medium comprises a program including instructions for permitting a computer to perform as the sections in the tag communication apparatus according to an embodiment of the present invention.

Each of the sections provided in the tag communication apparatus according to an embodiment of the present invention may be realized by a computer. In this case, the computer is operated as each of the sections. Thus, each of the sections can be realized by the computer.

Further, a tag communication control system according to an embodiment of the present invention comprises the tag communication apparatus according to an embodiment of the present invention, and a management section for managing at least one object such as goods, people and a living being correlated with the RFID tag on the basis of a result obtained from the communication with the RFID tag by the tag communication apparatus.

According to the above-described configuration, a system can be easily constituted that can, in managing goods, people and the living being correlated with the RFID tag, recognize positional information thereof.

In the tag communication control system according to an embodiment of the present invention, the management section includes a photographing section which photographs a space region, and a photographing control section which controls at least one of a photographing direction and a photographing range in the photographing section, and the photographing control section performs the photographing control on the basis of the position of the RFID tag specified by the apparatus.

According to the above-described configuration, when it is required to specify a specific goods, a person or a living being in accordance with the result of the communication with the RFID tag, the photographing section performs photographing in direction of the position of the specified RFID tag so that a corresponding object may be specified and its evidence can be left.

As described above, in the tag communication apparatus and the control method for the tag communication apparatus according to the present invention, the incoming direction of the radio wave from the RFID tag in each of the antennas is estimated, and the position of the RFID tag is calculated on the basis of the estimated incoming direction. Accordingly, the tag communication apparatus can be effectively provided in which the position of the RFID tag capable of communication can be specified only by performing a signal processing of signals received by the plurality of the antennas in the tag communication apparatus side without adding any special configurations to the RFID tag side.

BRIEF DESCRIPTION OF THE DRAWINGS

FIG. 12 is a diagram showing an example in which the RFID tag communication system of an embodiment is applied to a system for monitoring the robbery of goods in a shop or the like.

FIG. 13 is a diagram showing an example in which the RFID tag communication system of an embodiment is applied to a place requiring a ticket wicket such as a station or a movie theater or the like.

DESCRIPTION OF THE PREFERRED EMBODIMENTS

Now, an embodiment of the present invention will be described below with reference to FIGS. 1 to 14.

[Configuration of Reader/Writer]

Figure 1:
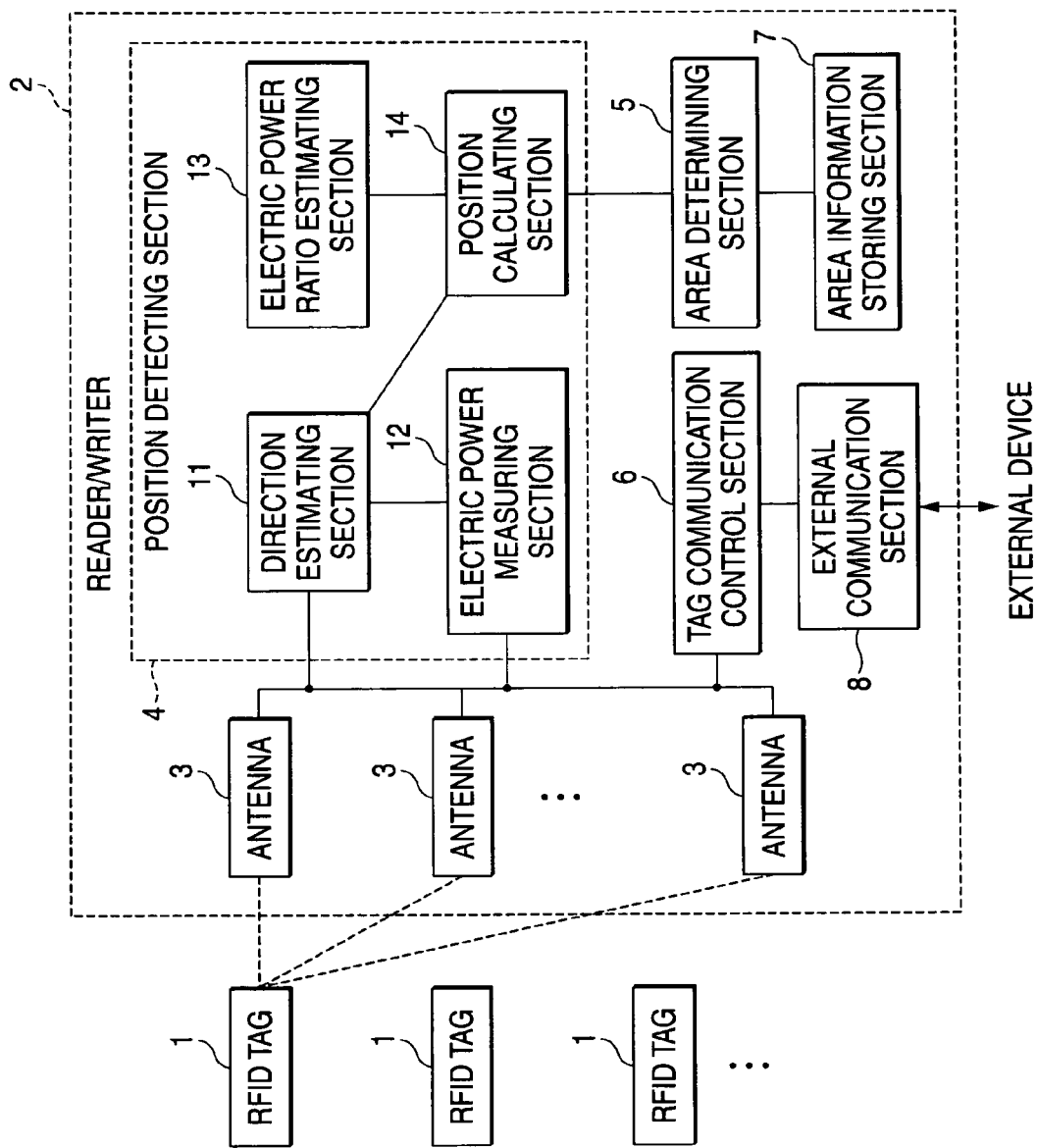
FIG. 1 is a block diagram showing a schematic configuration of an RFID tag communication system according to an embodiment of the invention.

FIG. 1 is a block diagram showing a schematic configuration of an RFID tag communication system according to an embodiment. As shown in FIG. 1, the RFID tag communication system includes one or more RFID tags 1 and a reader/writer (a tag communication apparatus) 2.

The RFID tag 1 is attached to various kinds of goods, and stores information related to the goods to which the RFID tag is attached, or objects or person related to the goods. The RFID tag 1 includes an IC (integrated Circuit) for a radio communication, a storing section and an antenna, etc. The usual RFID tag 1 does not have a power source such as a battery, and performs a radio communication with the reader/writer 2 by operating a circuit with an electric power supplied by a radio wave from the reader/writer 2.

The reader/writer 2 performs the radio communication with each of the RFID tags 1, and reads and writes the information stored in the RFID tag 1. In this embodiment, the reader/writer 2 reads and writes the information stored in the RFID tag 1. However, the reader/writer is not limited thereto, and may be an RFID reader that simply reads the information stored in the RFID tag 1.

In this embodiment, the frequency band of a radio wave transmitted by the reader/writer 2 is what is called a UHF band of approximately from 800 MHz to 960 MHz. The radio wave of such a frequency band is employed so that the reader/writer 2 can communicate with the RFID tag 1 located within a range of distance of about several meters.

The reader/writer 2 includes two or more antennas 3, a position detecting section 4, an area determining section 5, a tag communication control section 6, an area information storing section 7 and an external communication section 8.

The antennas 3 serve to transmit the radio wave to the RFID tags 1, and receive the radio wave transmitted from the RFID tags 1. The antenna 3 is configured with, for instance, a patch antenna, an array antenna or the like, and has a plurality of antenna elements and voltage controlling phase shifters respectively corresponding to the antenna elements.

The position detecting section 4 is a block for detecting the position of each of the RFID tags 1 on the basis of the receiving state of the radio wave in each of the antennas 3. The position detecting section 4 includes a direction estimating section 11, an electric power measuring section (radio wave measuring section) 12, an electric power ratio estimating section (intensity ratio estimating section) 13 and a position calculating section 14.

The direction estimating section 11 is a block for estimating a direction (angle) in which the RFID tag 1 is located from each of the antennas 3 when the radio wave from the specific RFID tag 1 is received in each of the antennas 3. The detail of a process for estimating the direction will be described below.

The electric power measuring section 12 is a block for measuring the intensity of the radio wave received in each of the antennas 3 when the radio wave from the specific RFID tag 1 is received in each of the antennas 3. Specifically, the electric power measuring section 12 measures the electric power of the radio wave received in each of the antennas 3. The measurement of the intensity of the received radio wave is not limited to the measurement of the electric power. Any of physical quantities may be measured by which the intensity of the radio wave can be measured.

The position calculating section 14 is a block for calculating the position of the RFID tag 1 on the basis of the direction in which the specific RFID tag 1 is located from each of the antennas 3 and which is estimated in the direction estimating section 11. The detail of a process for calculating the position will be described below.

The electric power ratio estimating section 13 is a block for estimating the ratio of the intensity of the radio wave from the RFID tag 1 respectively received in the antennas 3 on the basis of the position of the RFID tag 1 calculated in the position calculating section 14. Here, in the position calculating section 14, the estimated ratio of the intensity of the received radio wave estimated in each of the antennas 3 is compared with the actual ratio of the intensity of the received radio wave that are actually measured by the electric power measuring section 12. Thus, an error in the detection of the position based on multipath is detected. The details of a process for estimating an electric power ratio and the details of a process for detecting the error in the detection of the position will be described below.

The area determining section 5 is a block for determining whether or not the RFID tag 1 is located within a space region (communication area) on the basis of the position calculated in the position calculating section 14. Area information about what type of space region the communication area belongs to is stored in the area information storing section 7. The area determining section 5 determines whether the position calculated in the position calculating section 14 exists within the communication area specified by the area information. Thus, the area determining section 5 determines whether or not the RFID tag 1 is present in the communication area.

The tag communication control section 6 is a block for controlling a reading and/or writing operation of information through the antenna 3 about the RFID tag 1 determined to be present in the communication area by the area determining section 5.

The external communication section 8 is a block for transmitting the information of the RFID tag 1 read in the reader/writer 2 to an external device, or receiving writing information to the RFID tag 1 from the external device. The external device is connected for communication to the external communication section 8 by a wired or a wireless system. In this case, the external device that operates in accordance with reading and writing processes in the RFID tag 1 by the reader/writer 2 may have a configuration in which the reader/writer 2 is incorporated.

The area information stored in the area information storing section 7 is set depending on an environment in which the reader/writer 2 is installed. The area information may be set, for instance, from the external device through the external communication section 8. The reader/writer 2 may be provided with a user interface for inputting the area information.

The position detecting section 4, the area determining section 5, the tag communication control section 6 and the external communication section 8 provided in the above-described reader/writer 2 can be realized by a computing unit such as a CPU executing a program stored in storing devices such as a ROM (Read Only Memory) or a RAM. Accordingly, a computer having the unit and the storing device simply reads a computer readable medium on which the program is recorded, and executes the program so that various kinds of functions and various kinds of processes of the position detecting section 4, the area determining section 5, the tag communication control section 6 and the external communication section 8 can be realized. Further, the program may be recorded on a removable computer readable medium, so that the various kinds of functions and the various kinds of processes can be realized on an arbitrary computer.

As the computer readable medium, a memory that is not shown in the drawings to perform a process on a computer, for instance, the ROM may be used as a program medium. Further, a program medium may be employed that can be read by inserting a computer readable medium into a program reading device as an external storing device that is not shown in the drawings.

In any case, the stored program preferably has a configuration accessed and executed by a microprocessor. Further, the program is executed preferably in a way that the program is read, the read program is downloaded in the program storing area of a microcomputer, and then the program is executed. The program to be downloaded is previously stored in a main apparatus.

When a system configuration is capable of connecting to a communication network including an Internet, a computer readable medium preferably carries the program in a fluid manner such as downloading the program from the communication network.

As described above, when the program is downloaded from the communication network, a program for downloading is preferably previously stored in the main apparatus or installed from a different computer readable medium.

[Estimation of direction in antenna]

Figure 2A:
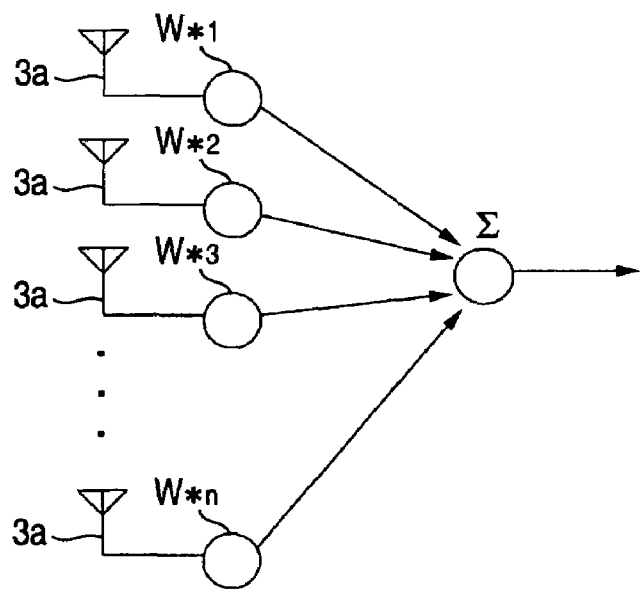
FIG. 2A is a diagram conceptually showing that a scanning operation is performed on the basis of the outputs of antenna elements provided in an antenna.
Figure 2B:
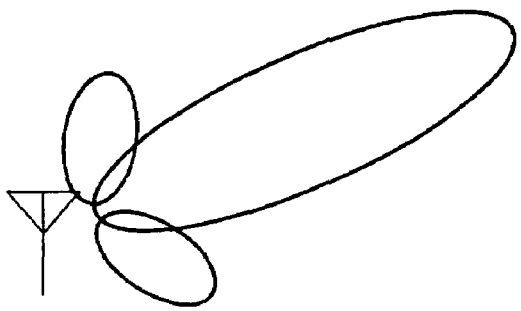
FIG. 2B and FIG. 2C are diagrams showing the change of directivity when the combinations of weights Wn are changed.
Figure 2C:
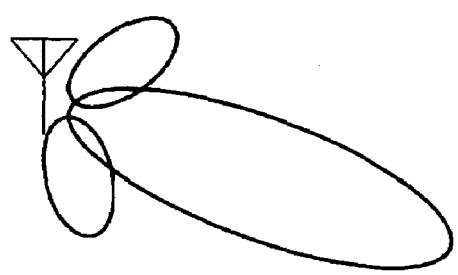

Next, a method will be described by which the direction estimating section 11 estimates in which direction the RFID tag 1 as a transmitter of the received radio wave is located with respect to the antenna 3 on the basis of the radio wave received in the antenna 3. FIG. 2A is a diagram conceptually showing a way of estimating the direction on the basis of the outputs of antenna elements 3a provided in the antenna 3. As shown in FIG. 2A, the direction estimating section 11 applies different weights Wn to the outputs of the antenna elements 3a respectively to detect the intensity of the radio wave in a specific direction on the basis of sum of signals. Then, the combinations of the weights Wn to the outputs of the antenna elements 3a are changed so that a scanning operation is realized by a signal process. FIG. 2B and FIG. 2C show the change of directivity (main lobe) when the combinations of the weights Wn are changed.

As described above, a technique that the scanning operation is realized by the signal process on the basis of the outputs from the antenna having the plurality of the antenna elements, and the incoming direction of the radio wave is estimated is called a DOA (Direction Of Arrival). As methods of the DOA, a Beamformer method, a Capon method, an LP (Linear Prediction) method, a Min-Norm method, a MUSIC method and an ESPRIT method, etc. may be exemplified. The Beamformer method and the Capon method of these methods are classified into a direction estimating method by a beam scanning method. The LP method, the Min-Norm method, the MUSIC method and the ESPRIT method are classified into a direction estimating method by a null scanning method.

Figure 3A:
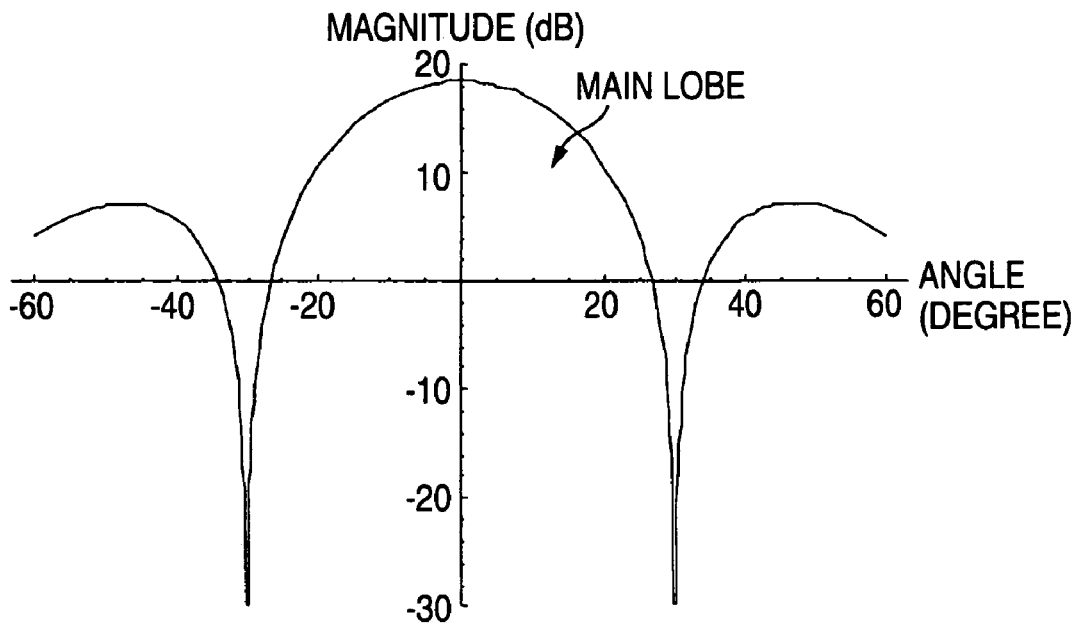
FIG. 3A is a graph showing an example of directivity in a beam scanning method.

The beam scanning method is a method for estimating the incoming direction of the radio wave on the basis of the highness of the electric power of the received radio wave. FIG. 3A is a graph showing an example of the directivity in the beam scanning method. In the case of the beam scanning method, the thickness of the main lobe (width of beam) affects an angular resolution. Accordingly, to enhance the resolution, the width of the beam needs to be reduced by, for instance, increasing the number of the antenna elements 3a in the antenna 3.

Figure 3B:
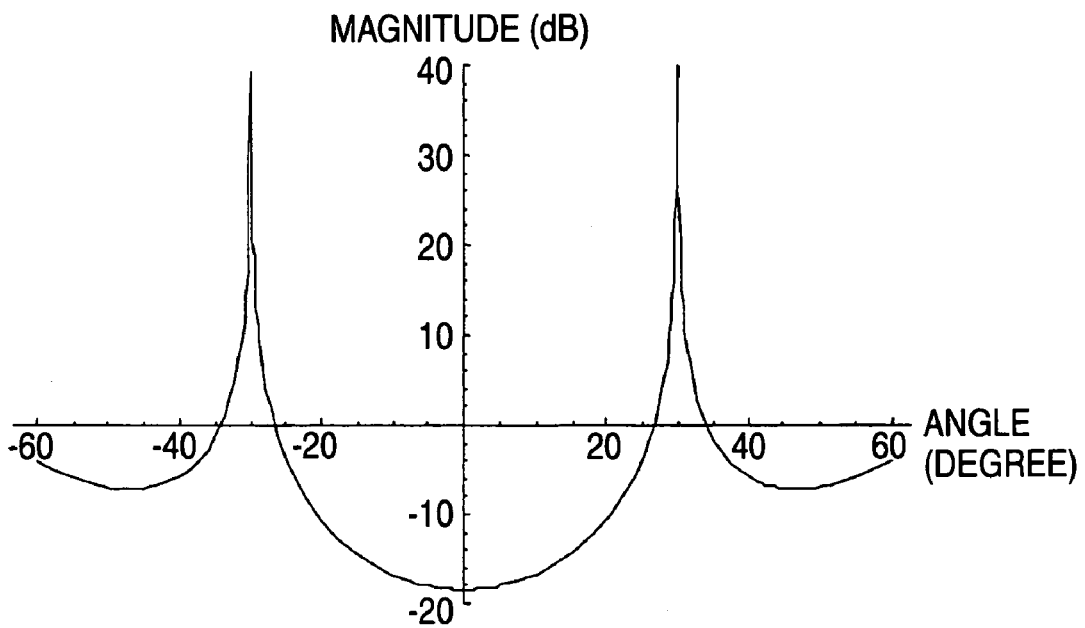
FIG. 3B is a graph showing an example of directivity in a null scanning method.

On the other hand, in the null scanning method, the conception of the beam scanning method is reversed. The null scanning method is a method for estimating the incoming direction of the radio wave on the basis of the lowness of the electric power of the received radio wave. FIG. 3B is a graph showing an example of the directivity in the null scanning method. The null scanning method has a merit that a highly accurate direction resolution can be obtained even with a small number of arrays (the number of the antenna elements).

Figure 4A:
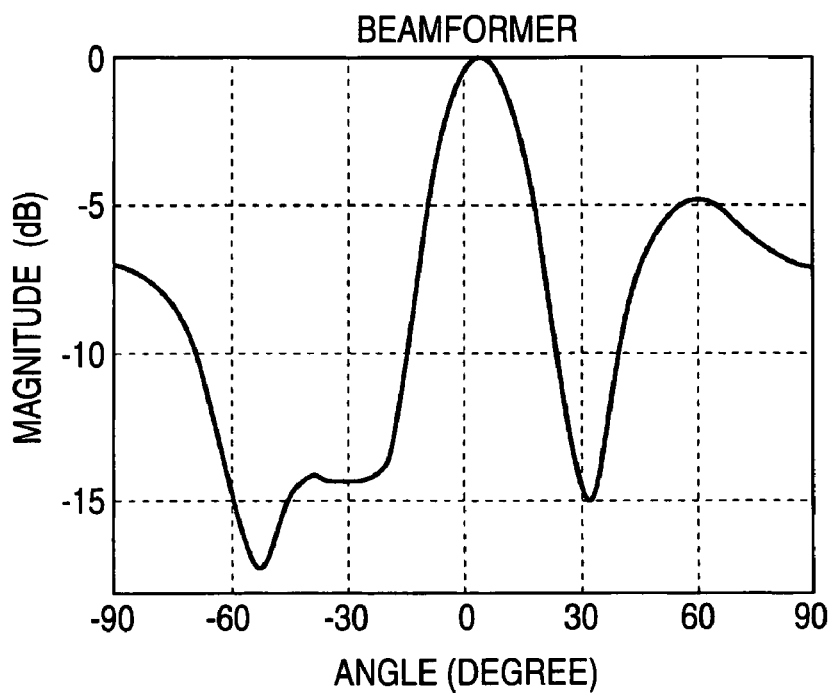
FIG. 4A is a graph showing a result of the estimated direction when a Beamformer method is used as an example of the beam scanning method.
Figure 4B:
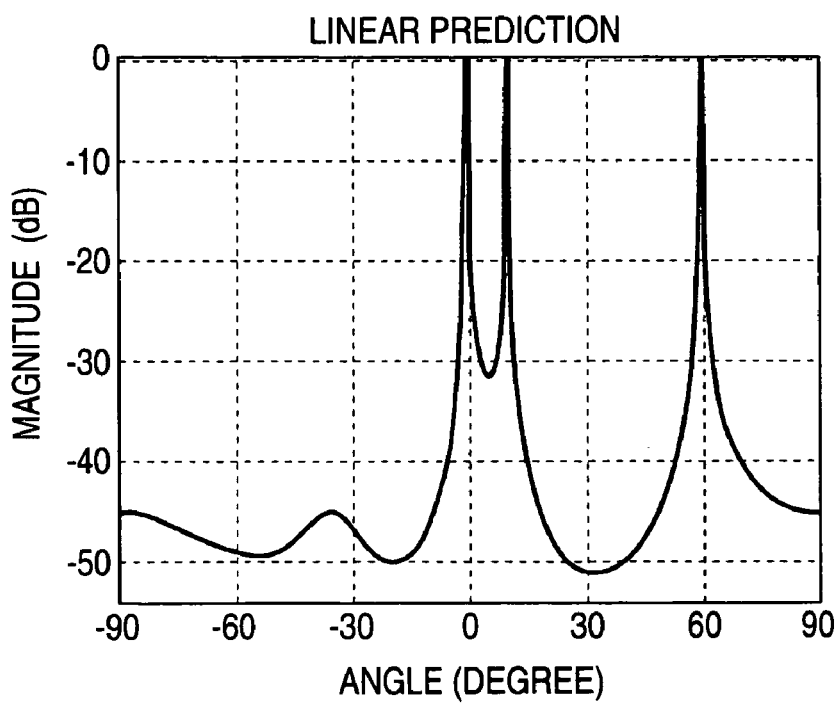
FIG. 4B is a graph showing a result of the estimated direction when the LP method is used as an example of the null scanning method.

Here, the difference in accuracy of the angular resolution between the beam scanning method and the null scanning method will be described below. FIG. 4A is a graph showing a result of the estimated direction when the Beamformer method is used as the example of the beam scanning method. FIG. 4B is a graph showing a result of the estimated direction when the LP method is used as the example of the null scanning method. In these graphs, a horizontal line shows an angle corresponding to a direction, and a vertical line shows intensity corresponding to the angle. Thus, it is determined that the radiowave comes from the angle having high intensity. In both the examples, an antenna having six antenna elements that are linearly arranged at intervals of λ (wavelength of incoming wave)/2 is used. Three incoming wave reach to the antenna from the directions at angles of 0°, 10° and 60° with the same intensity. Further, an SNR (Signal to Noise Ratio) is 20 dB.

As shown in these graphs, in the Beamformer method, the resolution is relatively low so that the detection of the incoming wave from 0° and 10° is overlapped and unclear. On the other hand, in the LP method, the three incoming wave are apparently detected with fine accuracy.

Figure 5A:
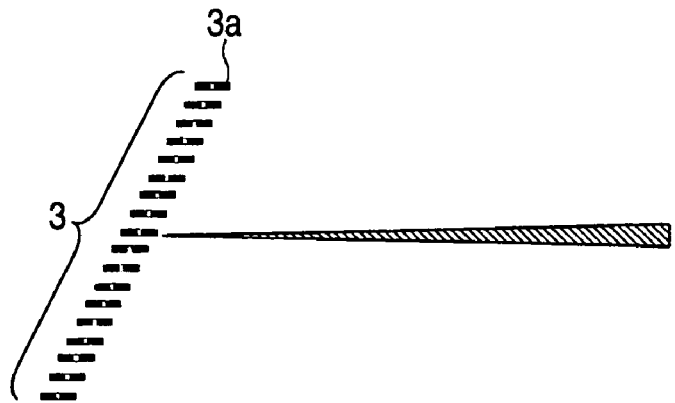
FIG. 5A and FIG. 5B are schematic views respectively showing the configuration of an antenna in the beam scanning method and the configuration of an antenna in the null scanning method under the same resolution.
Figure 5B:
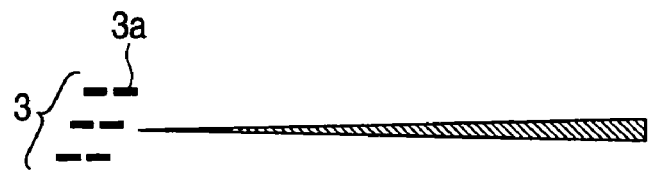

As described above, when the LP method by the null scanning method is employed, the direction of the incoming wave can be detected with a higher resolution than that of the beam scanning method under the same configuration of the antenna and the same conditions, compared to the beam scanning method. Conversely, when the LP method by the null scanning method is employed under the same resolution, the number of antenna elements in the antenna can be reduced more than that of the beam scanning method. Thus, the size of the antenna can be decreased more than that of the beam scanning method. FIG. 5A and FIG. 5B respectively show the configuration of the antenna 3 in the beam scanning method and the configuration of the antenna 3 in the null scanning method under the same resolution.

As described above, according to the null scanning method, while the increase in size of the antenna 3 is suppressed, the angular resolution in the incoming direction of the radio wave can be enhanced. In this embodiment, the direction estimating section 11 estimates the direction by using the LP method by the null scanning method. The method of the DOA employed in the direction estimating section 11 is not limited to the LP method. Other method of the null scanning method may be employed. Further, the direction estimating section 11 may employ the beam scanning method depending on a permissible size of the antenna 3 or a required resolution.

[Position calculating process]

Figure 6:
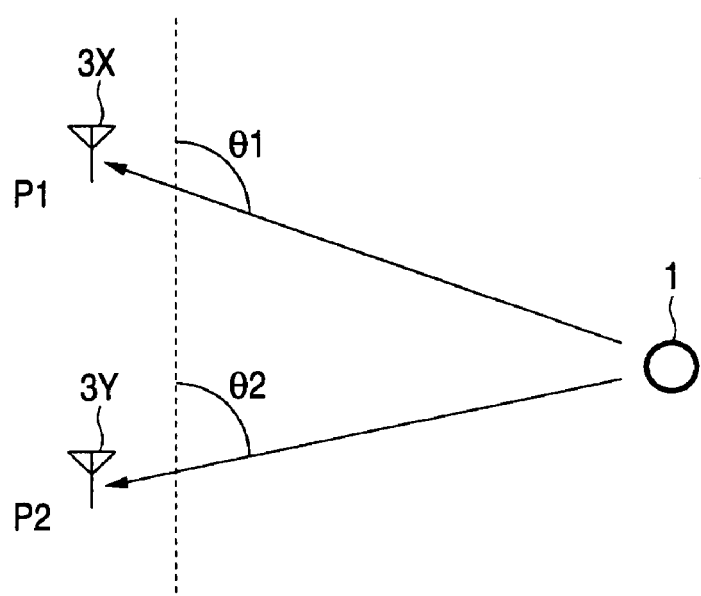
FIG. 6 is a diagram for explaining a method for estimating the position of an RFID tag on the basis of the estimation of incoming directions of radio wave in two antennas.

Next, a method will be described by which the position calculating section 14 calculates the arranged position of the RFID tag 1 on the basis of the arranged directions of the RFID tag in each of the antennas 3 estimated by the direction estimating section 11. FIG. 6 is a diagram for explaining a method for estimating the position of the RFID tag 1 on the basis of the estimation of the incoming directions of the radio wave by two antennas 3X and 3Y.

Firstly, the direction estimating section 11 estimates that an angle showing the direction in which the RFID tag 1 is arranged is θ1 on the basis of a receiving state in the antenna 3X. Further, the direction estimating section 11 estimates in the same manner that an angle showing the direction in which the RFID tag 1 is arranged is θ2 on the basis of a receiving state in the antenna 3Y.

Then, the position calculating section 14 calculates the position of the RFID tag 1 on the basis of the above-described θ1 and θ2, and the positions P1 and P2 in which the antenna 3X and the antenna 3Y are arranged. Specifically, an intersecting point of a straight line directed to the direction at the angle of θ1 from the antenna 3X and a straight line directed to the direction at the angle of θ2 from the antenna 3Y is calculated as the position of the RFID tag 1.

[Multipath detecting process]

Figure 7:
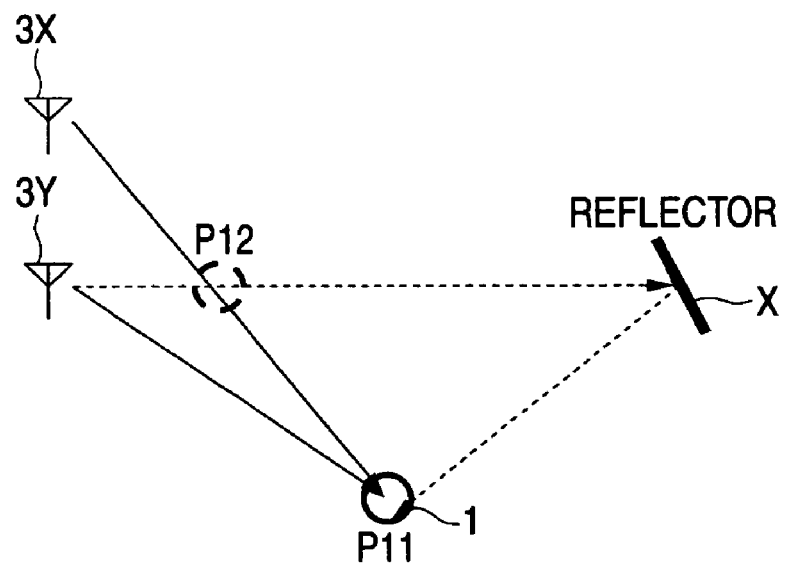
FIG. 7 is a diagram for explaining a phenomenon that a position is erroneously detected by multipath.

Next, a method of detecting an error in the position detection based on multipath in the position calculating section 14 will be described. Firstly, referring to FIG. 7, a phenomenon in which the position is erroneously detected due to the multipath will be described. In FIG. 7, the RFID tag 1 is arranged in a position shown as P11. When the two antennas 3X and 3Y directly receive the radio wave from the RFID tag 1, the position P11 can be precisely detected. However, as shown in FIG. 7, when a reflector X exists, for instance, when the antenna 3Y receives the radio wave outputted from the RFID tag 1 and reflected by the reflector X, the direction estimating section 11 recognizes the incoming direction of the radio wave in the antenna 3Y as a direction different from the direction in which the RFID tag 1 is actually located. As a result, the position calculating section 14 calculates the position where the RFID tag 1 locates as a position P12 different from the actual position.

Thus, the position calculating section 14 compares the estimated ratio of the intensity of the radio wave respectively received in the antennas 3 that is estimated by the electric power ratio estimating section 13, with the actual ratio of the intensity of the received radio wave that is actually measured by the electric power measuring section 12, so as to detect the error in the detection of the position.

Specifically described, in the electric power measuring section 12, an electric power PX of the received radio wave in the antenna 3X and an electric power PY of the received radio wave in the antenna 3Y are firstly measured. On the other hand, the electric power ratio estimating section 13 recognizes a distance from the antenna 3X to the RFID tag 1 and a distance from the antenna 3Y to the RFID tag 1 on the basis of the position of the RFID tag 1 calculated in the position calculating section 14. Then, the electric power ratio estimating section 13 calculates the ratio of an estimated electric power PX' of the received radio wave in the antenna 3X and an estimated electric power PY' of the received radio wave in the antenna 3Y on the basis of these distances.

Subsequently, the position calculating section 14 calculates a difference between PX/PY and PX'/PY'. When the absolute value of the difference is larger than a value Ps, the position calculating section 14 determines that the detection of the position is an erroneous detection due to the multipath. That is, the position calculating section 14 detects the error in the detection of the position by using a below-described principle. Initially, distances to each of the antennas 3 from the position of the RFID tag 1 detected on the basis of the estimation of the direction including the multipath are respectively different from distances to the antennas 3 from the actual position of the RFID tag 1. Accordingly, when the estimation of the direction including the multipath is carried out, the ratio of the actual electric power of the received radio wave is different from the ratio of the electric power of the received radio wave based on the calculated position. The position calculating section 14 can detect the error in the detection of the position based on the multipath in accordance with the above-described processes.

[Area determination by position detection]

Figure 8:
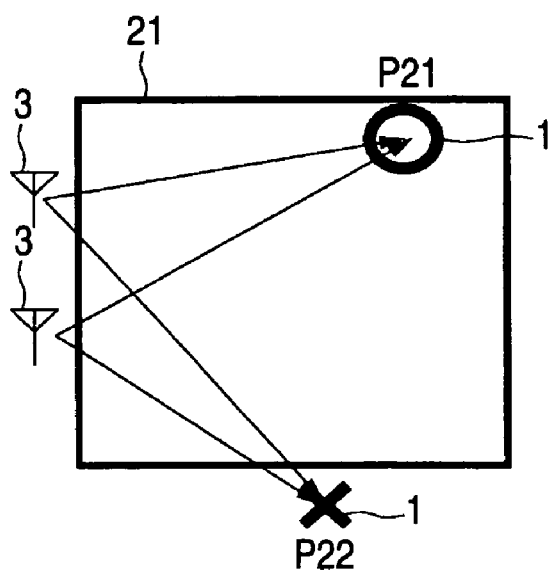
FIG. 8 is a diagram for explaining an area determining process.

Next, an area determining process in the area determining section 5 will be described below. FIG. 8 is a diagram for explaining the area determining process. The area determining section 5 obtains the information of the calculated position of the RFID tag 1 from the position calculating section 14, and reads the area information related to the communication area stored in the area information storing section 7.

For instance, in an example shown in FIG. 8, when the communication area is a space region shown by 21 and the calculated position of the RFID tag 1 is a position P21, since the position P21 is located within the communication area 21, the RFID tag 1 is recognized to be present within the communication area. On the other hand, when the calculated position of the RFID tag 1 is a position P22, since the position P22 is located outside the communication area 21, the RFID tag 1 is recognized to exist outside the communication area.

Here, when an obstacle or the like exists within the communication area, the positional information of the obstacle may be included in the area information stored in the area information storing section 7. In this case, even when the position calculated by the position calculating section 14 is located within the communication area, if it is determined that the calculated position is in the space region in which the obstacle exists, the position may be recognized to be erroneously detected.

[Flow of processes in reader/writer]

Figure 9:
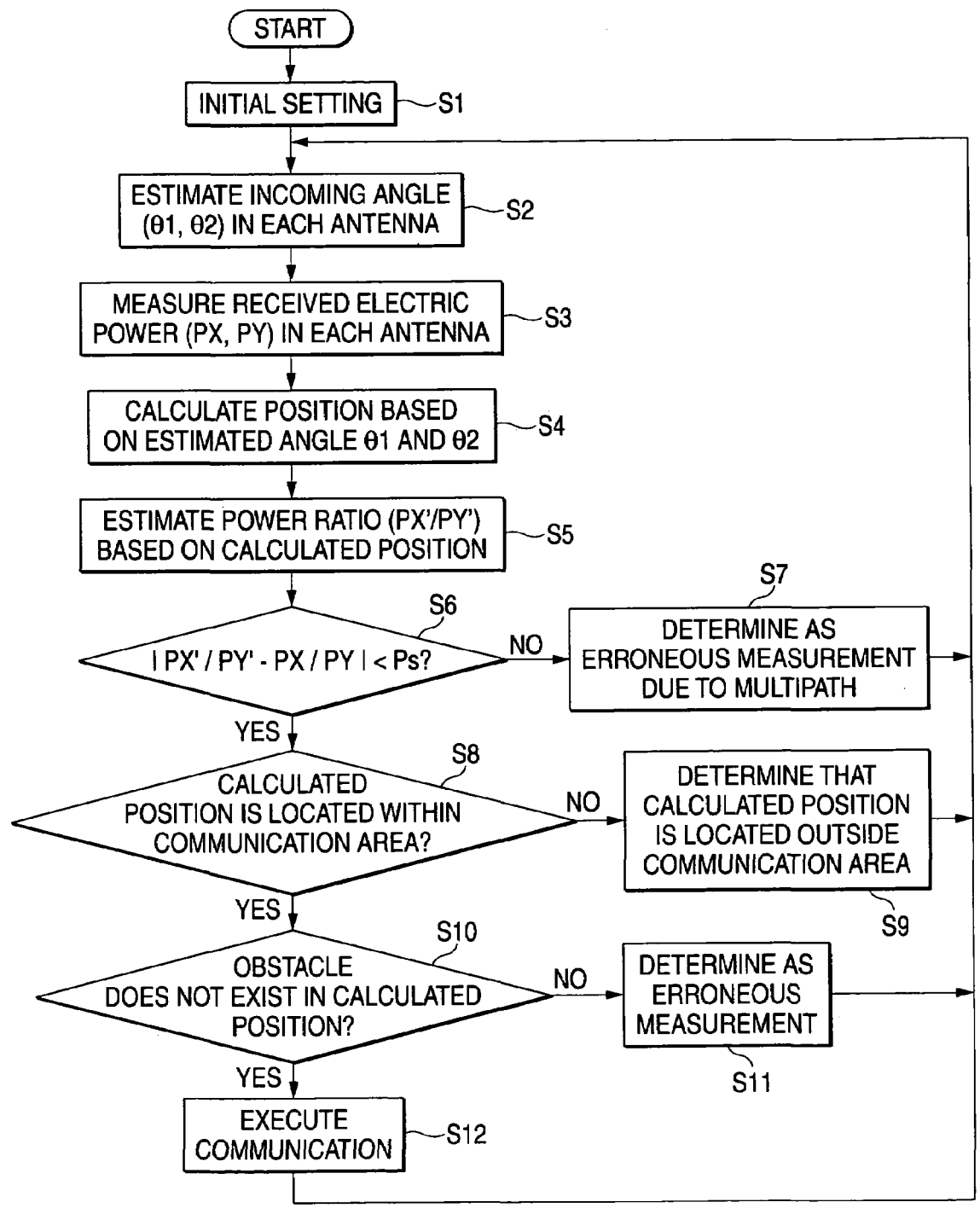
FIG. 9 is a flowchart showing the flow of processes in a reader/writer.

Next, a flow of processes in the reader/writer 2 will be described below by referring to a flowchart shown in FIG. 9. Firstly, in step 1 (hereinafter, referred as S1), an initial setting is carried out. As the initial setting, the area information stored in the area information storing section 7 is set, and the value Ps used for detecting the erroneous detection due to the multipath in the position calculating section 14 is set. The initial setting process may be carried out from the external device through, for instance, the external communication section 8 as described above, or may be inputted by a user interface provided in the reader/writer 2 for inputting the area information. The initial setting is performed, for instance, when the reader/writer 2 is initially installed. Once the initial setting is performed, the initial setting is not carried out upon start using (turning on a power) the reader/writer 2 as long as change in the initial setting is required thereafter, and a next process from S2 is started.

After the initial setting is performed, the antennas 3 respectively wait for receiving the radio wave from the RFID tag 1. Then, in S2, when each of the antennas 3 receives the radio-wave from the RFID tag 1, the direction estimating section 11 performs a process for estimating the angles of the incoming radio wave in the antennas 3 respectively. When two antennas 3 are provided, the direction estimating section 11 respectively calculates incoming angles θ1 and θ2 of the radio wave in the antennas 3.

Then, in S3, the electric power measuring section 12 measures the electric power of the radio wave from the RFID tag 1 respectively received in the antennas 3. When the two antennas 3 are provided, the electric power measuring section 12 measures an electric power PX and PY of the received radio wave in the two antennas 3 respectively.

Then, in S4, the position calculating section 14 calculates the position of the RFID tag 1 on the basis of the incoming angles in the antennas respectively which are calculated in the direction estimating section 11 in the S2. When the two antennas 3 are provided, the position of the RFID tag 1 is calculated on the basis of the incoming angles θ1 and θ2 of the radio wave in the antennas 3 respectively.

Then, in S5, the electric power ratio estimating section 13 performs a process for estimating the ratio (power ratio) of the intensity of the radio wave received from the RFID tag 1 in the antennas 3 respectively on the basis of the position of the RFID tag 1 calculated by the position calculating section 14 in the S4. When the two antennas 3 are provided, the ratio PX'/PY' of the intensity of the received radio wave is estimated.

Then, in S6, the position calculating section 14 performs a process for detecting an error in the detection of the position based on the multipath. Specifically, the position calculating section 14 calculates a difference between PX/PY and PX'/PY'. When the absolute value of the difference is larger than a value Ps, the position calculating section 14 determines that the detection of the position is an erroneous detection due to the multipath.

In S6, in the case of NO, that is, when the absolute value of the difference between PX/PY and PX'/PY' is larger than the value Ps, it is determined that the detection of the position is the erroneous detection due to the multipath (S7). Thus, a communication with the RFID tag 1 is not performed, and the process returns to the S2. On the other hand, in the S6, in the case of YES, that is, when the absolute value of the difference between PX/PY and PX'/PY' is smaller than the value Ps, it is determined that the detection of the position is not affected by the multipath, and processes from next S8 are performed.

In S8, the area determining section 5 determines whether or not the position calculated by the position calculating section 14 is located within the communication area. In the S8, in the case of No, that is, when it is determined that the position calculated by the position calculating section 14 is located outside the communication area, it is determined that the RFID tag 1 is located outside the communication area (S9). Thus, a communication with the RFID tag 1 is not performed, and the process returns to the S2.

On the other hand, in the S8, in the case of YES, that is, when it is determined that the position calculated by the position calculating section 14 is located within the communication area, the area determining section 5 determines whether an obstacle is not present in the position calculated in the position calculating section 14 in S10. In the case of NO in the S10, that is, when it is determined that the obstacle is present in the position calculated in the position calculating section 14, it is determined that the calculated position is erroneously measured (S11). Thus, a communication with the RFID tag 1 is not performed, and the process returns to the S2.

On the other hand, in the case of YES in the S10, that is, when it is determined that the obstacle is not present in the position calculated by the position calculating section 14, it is determined that the position is properly calculated, and a communication process with the RFID tag 1 is performed under the control of the tag communication control section 6 (S12). Further, a communication result by the tag communication control section 6 is transmitted to the external device through the external communication section 8. Further, the tag communication control section 6 performs a communication process on the basis of a communication instruction received from the external device through the external communication section 8. Then, the processes from the S2 are repeated until the operation of the reader/writer 2 is instructed to stop.

[Position calculation when three or more antennas are provided]

In the above-described example, the two antennas 3 are provided to calculate the position of the RFID tag 1. However, three or more antennas 3 may be provided and the position of the RFID tag 1 may be calculated on the basis of the estimation of the incoming directions of the radio wave in all the antennas 3. In this case, assuming that the combinations of the two antennas 3 taken out from the plurality of the antennas 3, the position of the RFID tag 1 is specified on the basis of positions calculated with each of the combinations. More specifically, the position of the RFID tag 1 is specified by majority voting from the positions calculated with each of the combinations.

Figure 10:
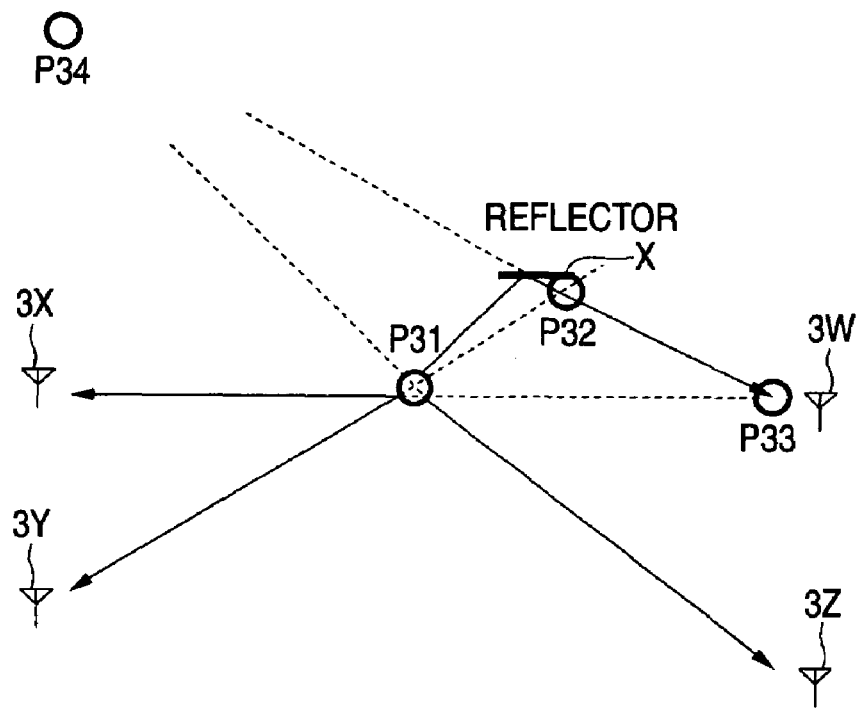
FIG. 10 is a diagram for explaining a method for calculating a position when four antennas are provided.

FIG. 10 is a diagram for explaining a method for calculating the position when four antennas 3X, 3Y, 3W and 3Z are provided. In this case, six positions are calculated by the antennas 3X and 3Y, the antennas 3X and 3W, the antennas 3X and 3Z, the antennas 3Y and 3W, the antennas 3Y and 3Z and the antennas 3W and 3Z.

In the example shown in FIG. 10, the position calculated by the antennas 3X and 3Y, the antennas 3X and 3Z and the antennas 3Y and 3Z is referred as P31. The position calculated by the antennas 3Y and 3W is referred as P32. The position calculated by the antennas 3X and 3W is referred as P33. The position calculated by the antennas 3W and the 3Z is referred as P34. In such a state, since there are many combinations of the antennas 3 that calculate the position P31, the position calculating section 14 calculates the position P31 as the position of the RFID tag 1. That is, the position P32, the position P33 and the position P34 are recognized as the erroneous detection due to the influence of the multipath. In the example shown in FIG. 10, the position P32, the position P33 and the position P34 are detected because the direction of the RFID tag 1 in the antenna 3W is erroneously estimated due to the multipath.

As described above, the three or more antennas 3 are provided so that an error in the detection of the position due to the multipath can be detected. Accordingly, the influence of the multipath that is not detected, for instance, by comparing the power ratio, can be detected by the detection of the position. Therefore, the position can be calculated more accurately.

When the positions calculated respectively by the combinations of the antennas 3 deviate within a range of a relatively small distance, it is anticipated that the deviation of the positions arises due to an error in estimating the directions. Accordingly, the positions that greatly deviate are excluded, and an average position of the positions located within a range of the distance may be calculated as the position of the RFID tag 1.

[Examples to which RFID tag communication system is applied]

Figure 11:
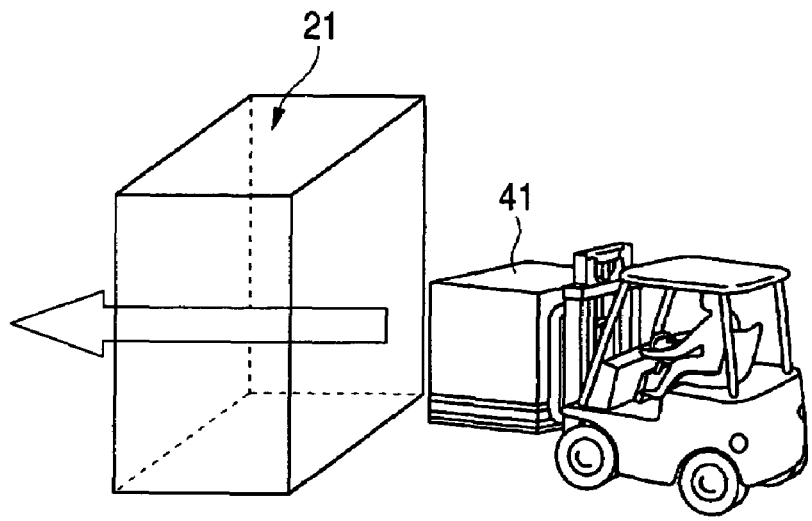
FIG. 11 is a diagram showing an example in which the RFID tag communication system according an embodiment is applied to a system for inspecting and checking goods to be distributed in a system where distribution of goods is performed.

Next, examples in which the RFID tag communication system according to this embodiment is applied to specific systems will be described below. FIG. 11 shows an example in which the RFID tag communication system is applied to a system for inspecting and checking distributed goods in a system where the distribution of goods is performed. In the example shown in FIG. 11, a plurality of goods to which the RFID tags 1 are attached are accommodated in a cargo 41 carried by a forklift. Then, the forklift passes a communication area 21 so that the reader/writer 2 perform communication with the RFID tags 1 respectively. Thus, the distribution of each of the goods can be controlled.

In such a system, when the system is the RFID tag communication system in which the communication area 21 is not clearly set, and when the RFID tag 1 that does not need to be communicated with is located at a position relatively near the reader/writer 2, a communication with the RFID tag 1 is likewise performed. Accordingly, the communication area 21 needs to be clearly set. However, in most of the cases, a radio wave absorber is hardly installed in an environmental point of view. As compared therewith, in the RFID tag communication system according to this embodiment, since the communication area 21 is set by the process in the reader/writer 2, there is no need to install something for an environment. That is, the RFID tag communication system according to this embodiment can be easily set irrespective of an environment in which the RFID tag communication system is installed.

Figure 12:
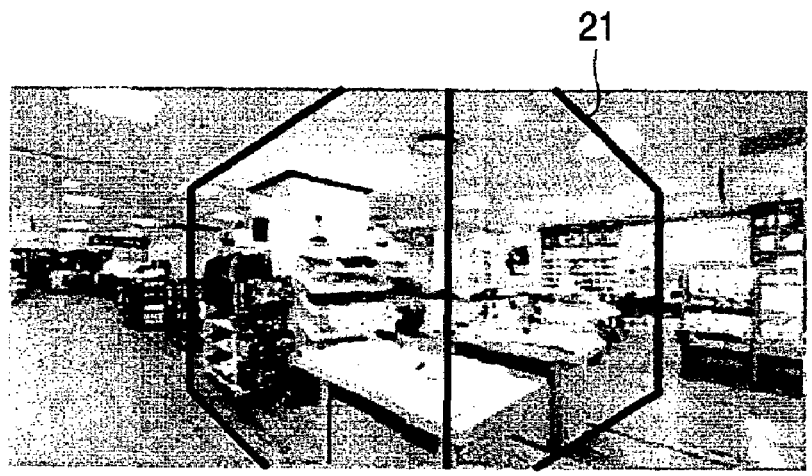

FIG. 12 shows an example in which the RFID tag communication system according to the embodiment is applied to a system for monitoring the robbery of goods in a shop or the like. Usually, for instance, in a CD shop, the RFID tags are attached to CDs or the like as the goods, and a system is employed in which a gate provided with a reader/writer communicating with the RFID tags is provided in an entrance of the shop. However, in such a system, the gates need to be provided in all the entrances to the shop. When the shop is installed in an open space as shown in FIG. 12, the system is hardly applied.

As compared therewith, in the RFID tag communication system according to this embodiment, the communication area 21 is set to an area where the entire part of the shop is covered as shown in FIG. 12. Thus, the gates do not need to be provided. Accordingly, the RFID tag communication system can be flexibly constructed in various kinds of environments of the shops.

Further, in the RFID tag communication system according to this embodiment, since the entire part of the shop can be set in the communication area 21, not only the robbery of the goods can be monitored, but also where a certain goods is located can be detected.

Figure 13:
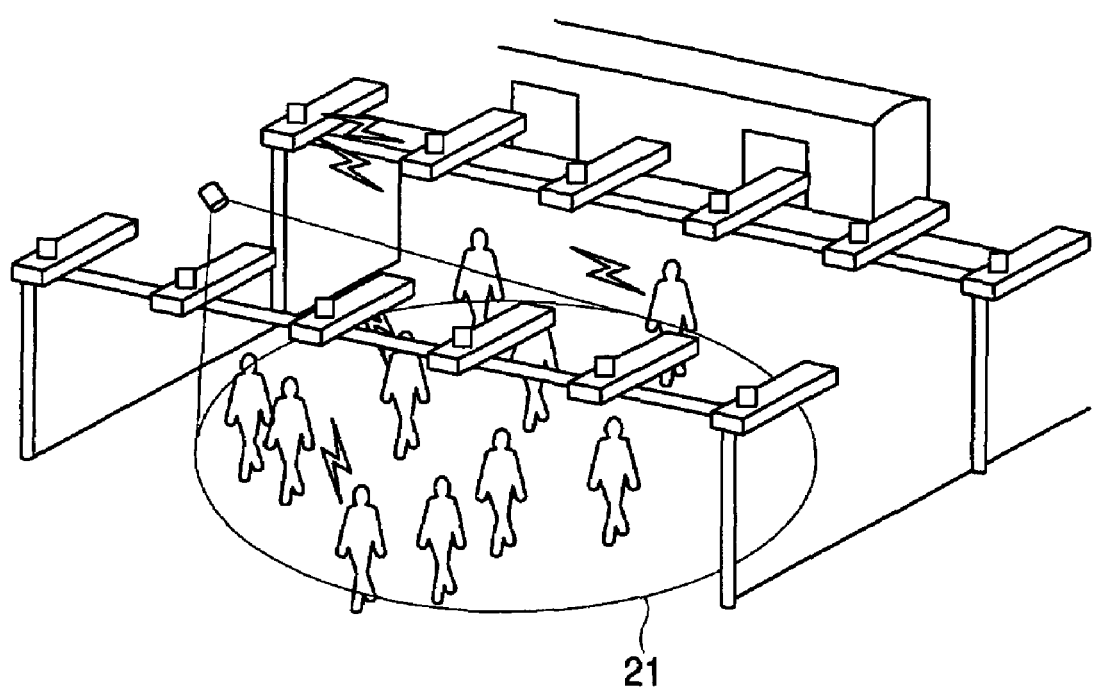

FIG. 13 shows an example in which the RFID tag communication system is applied to a place requiring a ticket wicket such as a station or a movie theater. In these days, for instance, in the wicket of the station, a system for examining tickets using the RFID tag has been spread. In this system, a reader/writer is provided in a gate to examine tickets. As compared therewith, in the RFID tag communication system according to this embodiment, the entire part of a passage for examining the tickets is set to the communication area 21. Accordingly, the tickets can be examined without providing the gate. In this case, the RFID tag 1 may be incorporated in a portable telephone possessed by a user.

[Examples of system configuration of RFID tag communication system]

Figure 14:
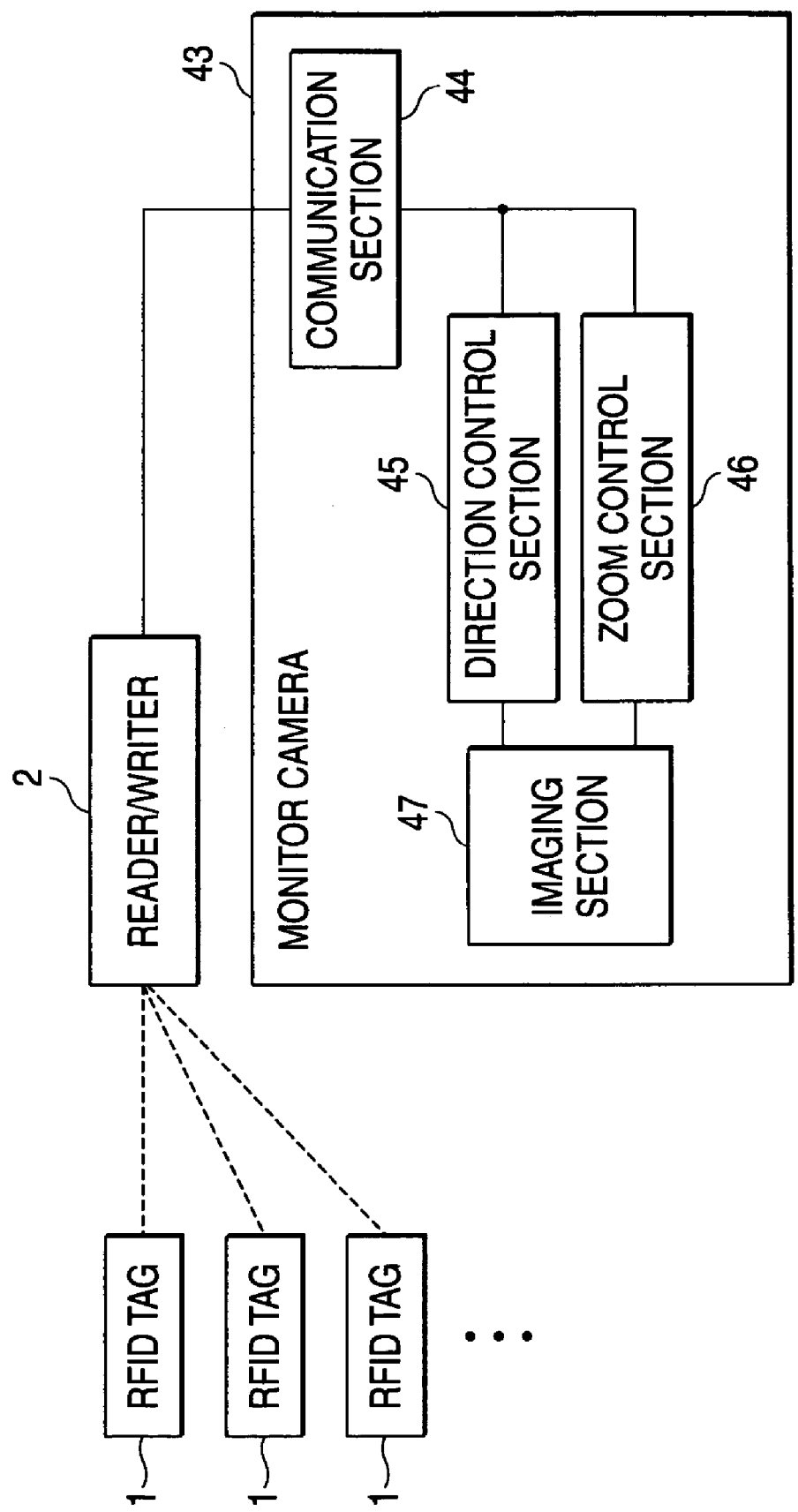
FIG. 14 is a block diagram showing an example of a system configuration in which a monitor camera is provided in the RFID communication system.
Figure 15A:
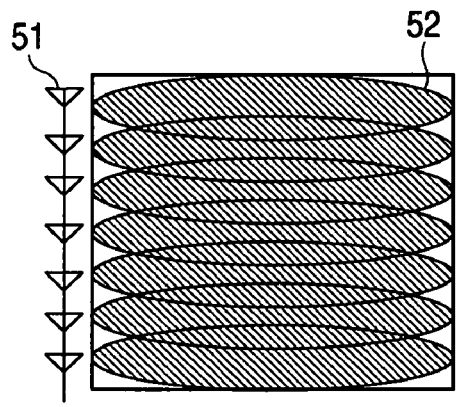
FIG. 15A shows an example in which beam forming areas are overlapped to control a communication area.
Figure 15B:
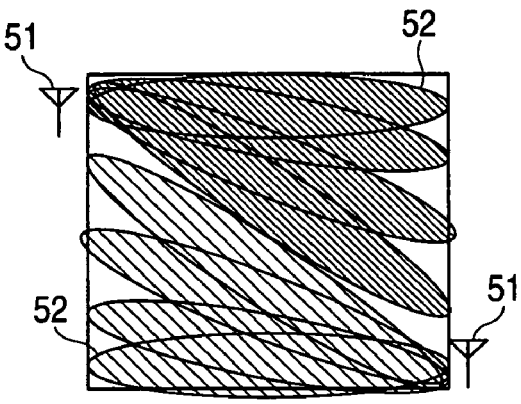
FIG. 15B shows an example in which a communication area is controlled by a beam scanning operation.
Figure 16A:
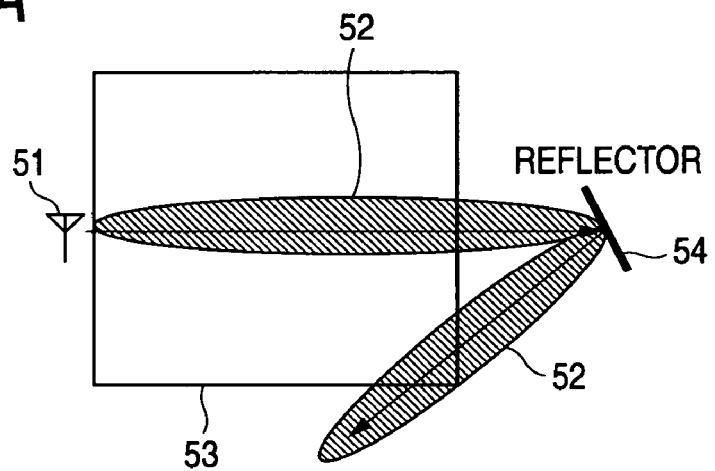
FIG. 16A shows a state that the multipath is generated.
Figure 16B:
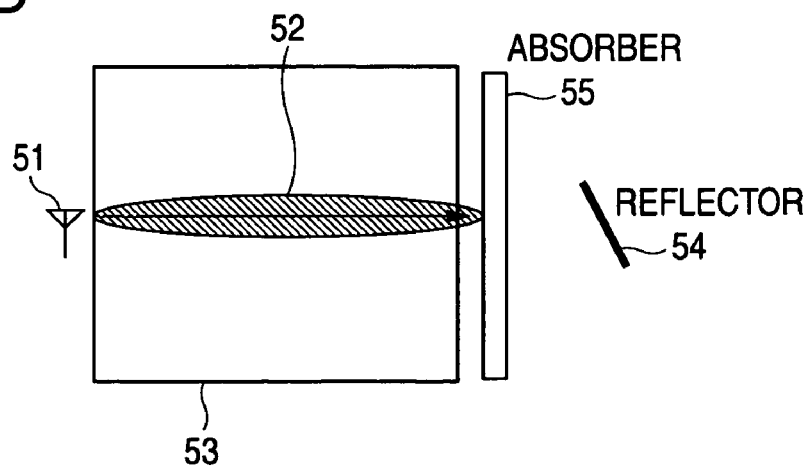
FIG. 16B is a diagram showing an example of providing a radio wave absorber in order to prevent the multipath.
Figure 17A:
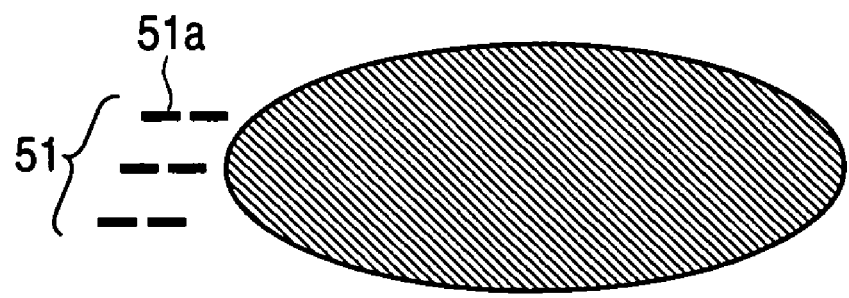
FIG. 17A is a diagram showing a state of the antenna elements provided in the antenna when the directivity is relatively low.
Figure 17B:
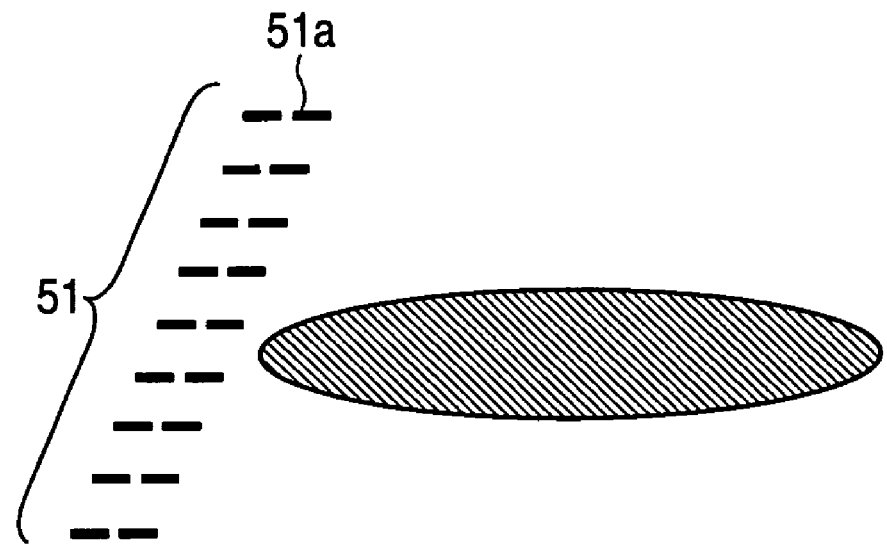
FIG. 17B is a diagram showing a state of the antenna elements provided in the antenna when the directivity is relatively high.
Figure 18:
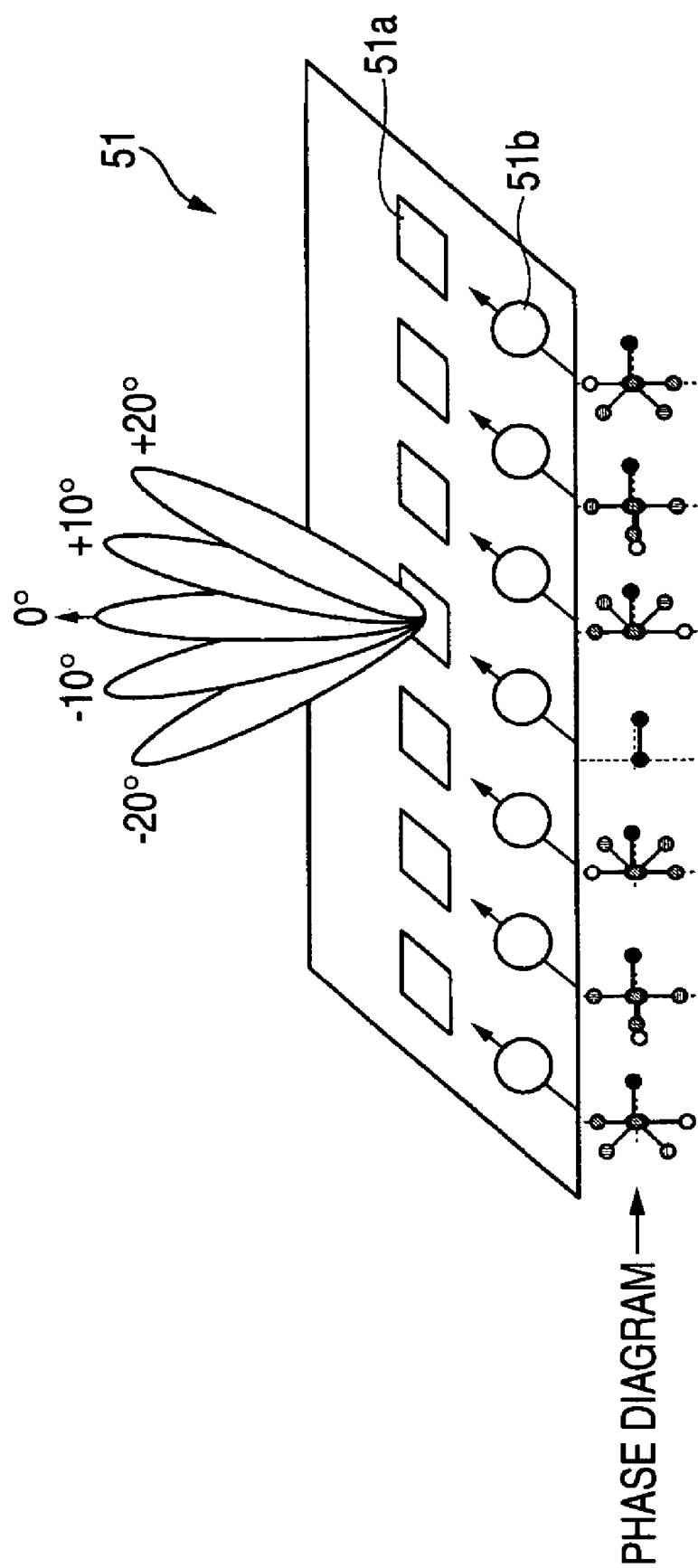
FIG. 18 is a diagram showing a state when the scanning direction of the antenna is changed.

Next, a system in which a monitor camera is provided in the above-described RFID tag communication system will be described below. For instance, in the example to which the system is applied as shown in FIG. 13, when there is a user who is not permitted to pass, in accordance with a communication result with the RFID tag 1, there may be a need to specify the who is not permitted to pass. In this case, the position of the user who is not permitted to pass which is specified by the reader/writer 2 is photographed by the monitor camera, so that the user who is not permitted to pass can be specified and an evidence thereof can be left. FIG. 14 shows a structural example in which a monitor camera (a photographing section) 43 is provided in the RFID tag communication system.

As shown in FIG. 14, the monitor camera 43 includes a communication section 44, a direction control section (a photographing control section) 45, a zoom control section (a photographing control section) 46 and an imaging section 47. The communication section 44 serves to communicate with a reader/writer 2 and obtains information related to a position to be photographed from the reader/writer 2.

The direction control section 45 controls a changing operation of a photographing direction by the imaging section 47 on the basis of the information related to the position to be photographed that is received by the communication section 44. The zoom control section 46 controls a zooming operation in the imaging section 47 on the basis of a distance between the position to be photographed that is received by the communication section 44 and the imaging section 47. The user who is not permitted to pass can be properly photographed by the above-described configuration.

The present invention is not limited to the above-described embodiment, and various kinds of changes may be made within a scope described in claims. That is, embodiments obtained by combining technical means suitably changed within the scope described in claims may be included in the technical scope of the present invention.

The tag communication apparatus and the tag communication system having the tag communication apparatus according to the present invention may be applied to the uses for various objects, such as the above-described system for inspecting and checking the goods to be distributed, the system for monitoring the robbery of the goods in the shop or the like, a wicket system installed in the place requiring a wicket for examining tickets such as the station or the movie theater, etc.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An apparatus configured to communicate with an RFID (Radio Frequency Identification) tag through a radio wave, said apparatus comprising:
   a plurality of antenna elements, each of which is configured to receive the radio wave from the RFID tag;
   a direction estimating section configured to estimate an incoming direction of the radio wave from the RFID tag at each of the antenna elements thereby obtaining estimated directions;
   a power measuring section configured to measure a power of the radio wave received by each of the antenna elements, thereby obtaining a measured power ratio;
   a position calculating section configured to calculate a position of the RFID tag based on the estimated directions; and
   a power ratio estimating section configured to estimate a ratio of powers to be received by the antenna elements based on the calculated position of the RFID tag, as an estimated power ratio;
   wherein the position calculating section is configured to compare the measured power ratio with the estimated power ratio to verify the calculated position of the RFID tag.

2. The apparatus or claim 1, wherein the direction estimating section estimates the incoming direction of the radio wave by null scanning.

3. A method for controlling an apparatus comprising a plurality of antenna elements each of which receives a radio wave from an RFID (Radio Frequency Identification) tag to communicate with the RFID tag, said method comprising:
   estimating an incoming direction of the radio wave from the RFID tag at each of the antenna elements, thereby obtaining estimated directions;
   measuring a power of the radio wave received by each of the antenna elements, thereby obtaining a measured power ratio ;
   calculating a position of the RFID tag based on the estimated directions;
   estimating a ratio of powers to be received by the antenna elements based on the calculated position of the RFID tag, as an estimated power ratio; and comparing the measured power ratio with the estimated power ratio to verify the calculated position of the RFID tag.

4. The method of claim 3, wherein the step of estimating an incoming direction is performed by executing a null scanning operation.

5. A computer readable medium comprising a program including instructions for controlling an apparatus comprising a plurality of antenna elements each of which is configured to receive a radio wave from an RFID (Radio Frequency Identification) tag to communicate with the RFID tag, said instructions comprising:
   estimating an incoming direction of the radio wave from the RFID tag at each of the antenna elements, thereby obtaining estimated directions;
   measuring a power of the radio wave received by each of the antenna elements, thereby obtaining a measured power ratio;
   calculating a position of the RFID tag based on the estimated directions;
   estimating a ratio of powers to be received by the antenna elements based on the calculated position of the RFID tag, as an estimated power ratio: and
   comparing the measured power ratio with the estimated power ratio to verify the calculated position of the RFID tag.

6. The computer readable medium of claim 5, wherein the method step of estimating an incoming direction is performed by executing a null scanning operation.

7. A tag communication control system comprising:
   an apparatus configured to communicate with an RFID (Radio Frequency Identification) tag through a radio wave, said apparatus including:
   a plurality of antenna elements each of which is configured to receive the radio wave from the RFID tag;
   a direction estimating section configured to estimate an incoming direction of the radio wave from the RFID tag at each of the antenna elements thereby obtaining estimated directions;
   a power measuring section configured to measure a power of the radio wave received by each of the antenna elements, thereby obtaining a measured power ratio;
   a position calculating section configured to calculate a position of the RFID tag based on the estimated directions; and
   a power ratio estimating section configured to estimate a ratio of powers to be received by the antenna elements based on the calculated position of the REID tag, as an estimated power ratio;
   a management section for managing at least one object correlated with the RFID tag based on a result obtained from the communication with the RFID tag by the apparatus;
   wherein the position calculating section is configured to compare the measured power ratio with the estimated power ratio to verify the calculated position of the RFID tag.

8. The tag communication control system as claimed in claim 7, wherein
   the management section includes a photographing section which photographs a space region, and a photographing control section which controls at least one of a photographing direction and a photographing range in the photographing section, and
   the photographing control section performs the photographing control based on the position of the RFID tag specified by the apparatus.

9. The tag communication control system of claim 7, wherein the direction estimating section is configured to estimate an incoming direction by executing a null scanning operation.

* * * * *